US005204891A

United States Patent [19]

Woodruff et al.

[11] Patent Number: 5,204,891
[45] Date of Patent: Apr. 20, 1993

[54] FOCAL TRACK STRUCTURES FOR X-RAY ANODES AND METHOD OF PREPARATION THEREOF

[75] Inventors: David W. Woodruff, Clifton Park; Minyoung Lee, Schenectady, both of N.Y.

[73] Assignee: General Electric Company, Schenectady, N.Y.

[21] Appl. No.: 785,122

[22] Filed: Oct. 30, 1991

[51] Int. Cl.[5] .......... H01J 35/08; C01B 31/04

[52] U.S. Cl. .......... 378/143; 378/125; 378/144; 378/127; 423/445; 423/448; 423/460; 427/367; 427/419.7; 427/402; 427/419.1

[58] Field of Search .......... 378/44, 121, 125, 127, 378/138, 143, 144, 145; 427/249, 250, 380, 367, 419.2, 419.7, 402, 404, 405; 423/448, 449, 460, 445

[56] References Cited

U.S. PATENT DOCUMENTS

| | | | |
|---|---|---|---|
| Re. 31,369 | 9/1983 | Devine, Jr. . | |
| Re. 31,568 | 4/1984 | Devine, Jr. | 378/125 |
| 3,442,006 | 5/1969 | Guichet et al. . | |
| 3,539,859 | 11/1970 | Bougle . | |
| 3,579,022 | 5/1971 | Hennig et al. | 378/125 |
| 3,649,355 | 3/1972 | Hennig | 378/144 |
| 3,660,053 | 5/1972 | Palme | 378/143 |
| 3,683,223 | 8/1972 | Dietz | 378/125 |
| 3,710,170 | 1/1973 | Friedel | 378/125 |
| 3,719,854 | 3/1973 | Sedlatschek et al. | 378/143 |
| 3,890,521 | 6/1975 | Shroff | 378/121 |
| 4,055,628 | 10/1977 | McCarroll et al. | 423/460 |
| 4,352,041 | 9/1982 | Hubner et al. | 378/144 |
| 4,670,201 | 6/1987 | Montgomery et al. | 423/448 |
| 4,761,272 | 8/1988 | Hucke | 423/448 |
| 4,799,250 | 1/1989 | Penato et al. | 378/144 |
| 4,901,338 | 2/1990 | Rodhammer et al. | 378/144 |
| 4,939,762 | 7/1990 | Baba et al. | 378/144 |
| 5,148,463 | 9/1992 | Woodruff et al. | 378/144 |

FOREIGN PATENT DOCUMENTS

| | | |
|---|---|---|
| 7112587 | 4/1971 | Fed. Rep. of Germany . |
| 2625033 | 12/1987 | France . |
| 1173859 | 7/1968 | United Kingdom . |
| 1247244 | 2/1969 | United Kingdom . |
| 1207648 | 7/1969 | United Kingdom . |
| 2084124 | 8/1981 | United Kingdom . |

*Primary Examiner*—Constantine Hannaher
*Assistant Examiner*—Kim-Kwok Chu
*Attorney, Agent, or Firm*—William H. Pittman

[57] ABSTRACT

An improved high performance x-ray tube having a rotating graphite anode therein and method of preparation thereof. The surface of a graphite anode body is oxidized in air for removing the surface damage caused during the machining of the anode body. The anode body is provided with a diffusion barrier layer of rhenium contiguously disposed on the substantially damage free surface of the anode body. An anode target layer is then deposited on top of the barrier layer.

8 Claims, 6 Drawing Sheets

FOCAL TRACK STRUCTURES FOR X-RAY ANODES AND METHOD OF PREPARATION THEREOF

FIELD OF THE INVENTION

The present invention relates to x-ray tubes and in particular to high performance targets used in x-ray generating equipment, such as computerized axial tomography (C.A.T.) scanners. More particularly, the invention is directed to high performance rotating x-ray tube anode structures having focal tracks with improved adherence.

BACKGROUND OF THE INVENTION

Workers in the field of designing rotary anodes for conventional x-ray imaging systems have long recognized the advantages of utilizing graphite in such constructions. However, it soon became evident that in using graphite there also exists the danger that when an anode target layer of tungsten, tungsten alloys, molybdenum and molybdenum alloys is in direct contact with graphite, reactions between the layer and the graphite (during manufacture of the rotary target and/or during the use thereof to generate x-ray beam) lead to the formation of a brittle intermediate carbide layer. The patent literature proposes various anode constructions as solutions to this problem, for example U.S. Pat. Nos. 3,660,053; 3,719,854 and British Patent Nos. 1,173,859; 1,207,648 and 1,247,244.

Another patent (U.S. Pat. No. 3,890,521) expresses concern with the formation of tungsten carbide by reaction between a graphite disc, or carrier, and the tungsten target layer while accepting the in situ formation of a carbide layer of tantalum (or presumably of hafnium, niobium or zirconium). The initial assembly of components consists of a graphite carrier upon which are successively deposited a first layer of iridium, osmium or ruthenium, a second layer of hafnium, niobium, tantalum or zirconium and then a target layer (e.g., tungsten). The desired layer of carbide (e.g., tantalum carbide) forms when, during operation of the x-ray tube, carbon diffuses across the first layer and reacts with the second layer. U.S. Pat. No. 3,710,170 is concerned with thermal stresses introduced in the rotary anode structure because of the difference in thermal expansion coefficients between tantalum carbide (U.S. Pat. No. 3,890,521) and the adjoining structure and between graphite (U.S. Pat. No. 3,710,170) and the adjoining structure. However, in the case of U.S. Pat. No. 3,710,170, as well as in U.S. Pat. No. 3,890,521, certain metal carbide content is deliberately employed as part of the solder material. For example, in U.S. Pat. No. 3,710,170 it is proposed that a molybdenum-molybdenum carbide eutectic be prepared by placing graphite in contact with molybdenum and heating to about 2200° C.

Still another concern is evident in British patent No. 1,383,557 wherein a solder layer of zirconium and/or titanium is employed to join graphite to molybdenum, tantalum or an alloy formed between two or more of tungsten, molybdenum, tantalum and rhenium. A carbide layer is formed between the graphite support and the solder layer. Particular temperature control and initial foil thickness are employed to insure survival of the solder layer.

The great variance in thought in the preceding prior art as to how to best join graphite to refractory metals, particularly tungsten, tungsten alloys, molybdenum and molybdenum alloys shows how complex this problem has remained in the design of rotary anodes for conventional x-ray apparatus.

These varied solutions to the extent they may be viable in conventional x-ray imaging systems, face a much more severe test in connection with the use of graphite members in x-ray tubes used in medical computerized axial tomography (C.A.T.) scanners. For the formation of images, medical C.A.T. scanner typically requires an x-ray beam of about 2 to 8 seconds duration. Such exposure times are much longer than the fractions-of-a-second exposure times typical for conventional x-ray imaging systems. As a result of these increased exposure times, much larger amount of heat (generated as a by-product of the process of x-ray generation in the target region) must be stored and eventually dissipated by the rotating anode.

Graphite, which provides a low mass, high heat storage volume, remains a prime candidate for rotating anode structures of C.A.T. scanner x-ray tubes, particularly when the graphite member functions as a heat sink from which heat is dissipated as radiant energy as disclosed in U.S. Pat. No. 3,710,170 and U.S. Pat. No. Re. 31,568.

One important consideration in the manufacture of a composite anode disc embodying a graphite member is the method by which the graphite is bonded to an adjacent tungsten, tungsten alloy, molybdenum or molybdenum alloy metallic surface. In spite of the favorable view taken of the presence of carbides of tantalum, hafnium, niobium, zirconium and of the eutectic of molybdenum carbide and molybdenum in U.S. Pat. No. 3,710,170 and/or U.S. Pat. No. 3,890,521, workers in the art view with alarm the formation of any layer of tungsten carbide or molybdenum carbide between the graphite member and an adjacent tungsten, tungsten alloy, molybdenum or molybdenum alloy surface to which the graphite must remain bonded. Formation of such a carbide layer is of particular concern, because of the propensity thereof for delamination. Delamination results in a reduction in heat flow from the anode target layer to the adjacent graphite member and loss of structural integrity of the anode which typically rotates at about 10,000 to about 15,000 revolutions per minute.

In x-ray tubes used in C.A.T. scanners, the bulk temperatures during operation of such anode reach about 1200° C.-1300° C. At such temperatures, tungsten, tungsten alloys, molybdenum or molybdenum alloys readily form the undesired metal carbide. Thus, it has been considered particularly important for such rotary anodes to devise a joining procedure and anode structure in which the metallic surface is not permitted to react with the graphite and, even more important, that provision is made in the composite anode structure to prevent reaction from occurring between the metallic surface and the graphite during operation of the C.A.T. scanner x-ray tube.

Three reissue patents (U.S. Pat. No. Re. 31,369; U.S. Pat. No. Re. 31,560 and U.S. Pat. No. Re. 31,568) issued to Thomas M. Devine, Jr., describe a brazing procedure in which a layer of platinum, palladium, rhodium, osmium, ruthenium or platinum-chromium alloy is interposed between the metallic surface and the graphite body to which it is to be joined. Although a brazed region develops above and below the interposed layer, this layer itself survives to function as a barrier to carbon diffusion during operation of the x-ray tube. The aforementioned braze materials are characterized by their ability to react with tungsten, tungsten alloys, molybdenum, molybdenum alloys and also with graphite. Because the reaction of the interposed layer with graphite can only proceed at a temperature in excess of the temperatures that are reached by the rotating anode in service, even at the maximum service temperatures an intermediate platinum layer, for example, will act as a diffusion barrier for carbon to prevent the passage thereof through the platinum, where it would be able to form brittle tungsten or molybdenum carbide.

The use of alloys of platinum as an intermediate layer to join graphite to tungsten or tungsten alloy is disclosed in Gebrauchmuster U.S. Pat. No. 7,112,589 and the use of alloys containing platinum as an intermediate layer to join graphite to tungsten or molybdenum is disclosed in U.S. Pat. No. 3,442,006. In both of these inventions the process for joining requires that the intermediate layer be melted. An intermediate layer of any of the alloys proposed in U.S. Pat. No. 3,442,006 would fail to provide a diffusion barrier to carbon at x-ray anode operating temperatures.

Provided that the brazing in the practice of the aforementioned Devine inventions is accomplished very quickly, formation of the objectionable carbide is avoided. At the typical brazing temperatures employed, the intermediate layer (e.g., platinum) melts and become saturated with carbon. By way of example, liquid platinum can, over a period of time at a temperature just above the eutectic temperature, dissolve up to about 16 atomic percent carbon. When tungsten or molybdenum is in contact with such a high carbon content liquid, carbide will form at the interface. The amount of time available for carbon to dissolve in the liquefied braze layer is, therefore, important and if the assembly being brazed remains at a high temperature for too long a period of time, a thick layer of carbide can form, which could delaminate during cooling or handling. In the case of the use of platinum as the braze layer to affix molybdenum to graphite, a temperature exposure of about 1800° C. for as little as about 5 minutes will result in a layer of molybdenum carbide about 0.003 inch in thickness.

The aforementioned drawback of carbide formation has been addressed in U.S. Pat. Nos. 4,901,338; 4,352,041; 3,579,022 and 3,539,859, U.K. Patent Specification No. 1247244, U.K. Patent Application No. 2084124 A and French Patent Publication No. 2625033 A1 by providing an intermediate layer of rhenium to separate the anode target layer from the underlying graphite anode body. Since adhesion of the intermediate layer to the surface of the graphite anode body is critical, it would be desirable to provide methods of improving adhesion for the intermediate layer to the surface of the graphite anode body, for producing high performance rotary anodes suitable in the increasingly rigorous environment of the C.A.T. scanner x-ray tube.

STATEMENT OF THE INVENTION

The invention is directed to an improved x-ray tube anode comprising, a graphite anode body having a substantially damage free region and a focal track layer disposed on the region for impingement by electrons for producing x-rays.

The invention is further directed to a method of producing a graphite substrate having a shape formed surface substantially free of damage caused during the shape forming of the surface comprising, oxidizing a damaged layer of the graphite on the shape formed surface until an undamaged surface underneath the damaged layer is exposed.

Other advantages of the invention will become apparent upon reading the following detailed description and appended claims, and upon reference to the accompanying drawings.

BRIEF DESCRIPTION OF THE DRAWINGS

For a more complete understanding of this invention reference should now be had to the embodiments illustrated in greater detail in the accompanying drawings and described below by way of examples of the invention.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
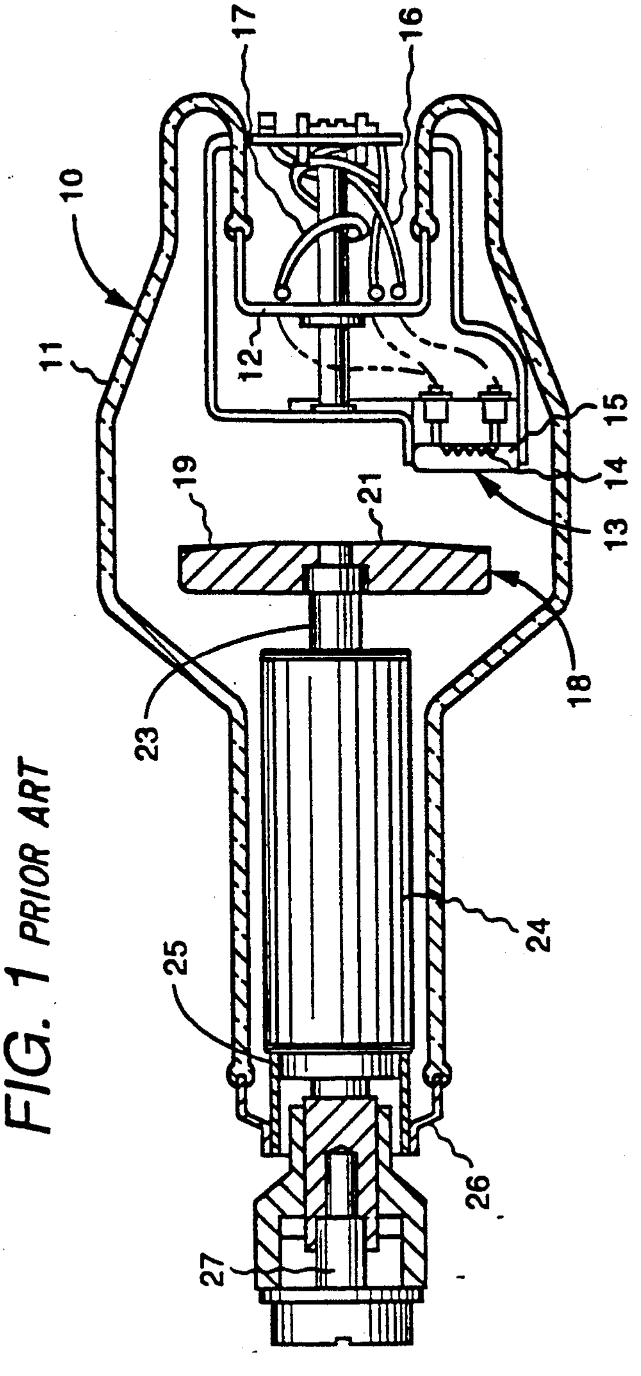
FIG. 1 PRIOR ART
FIG. 1 is an exemplar of a rotating anode x-ray tube, shown in section, in which an improved anode of this invention may be employed.

There is shown in FIG. 1, an illustrative x-ray tube represented by numeral 10. X-ray Tube 10 comprises a hermetically sealed and substantially evacuated envelope 11. Envelope 11 is generally made of x-ray transparent material, such as glass. At a first end of envelope 11 there is positioned a cathode support partly sealed into the first end. A cathode structure 13 comprising an electron emissive filament 14 and a focusing cup 15 is mounted on support 12. Filament 14 is provided with a pair of filament conductors 16 for supplying heating current to filament 14. Cathode structure 13 is further provided with an electronically grounded conductor 17 for maintaining cathode structure 13 at ground or maintaining a negative potential with respect to an anode 18 of x-ray tube 10. Anode 18 (also referred to as target) is positioned in an opposing relationship with filament 14.

An anode body 21 of anode 18 generally has a disc shape and is typically made of materials such as molybdenum alloyed with titanium and zirconium, or carbon in the form of graphite. A polycrystalline graphite is preferred. The polycrystalline graphite customarily used for x-ray tube targets generally comprises graphite crystallites held together with a binder, such as coal tar pitch, which has been somewhat graphitized during the graphite forming process. Medium density graphite in the range of about 1.75 to about 1.85 grams per cubic centimeter is most suitable.

Figure 5:
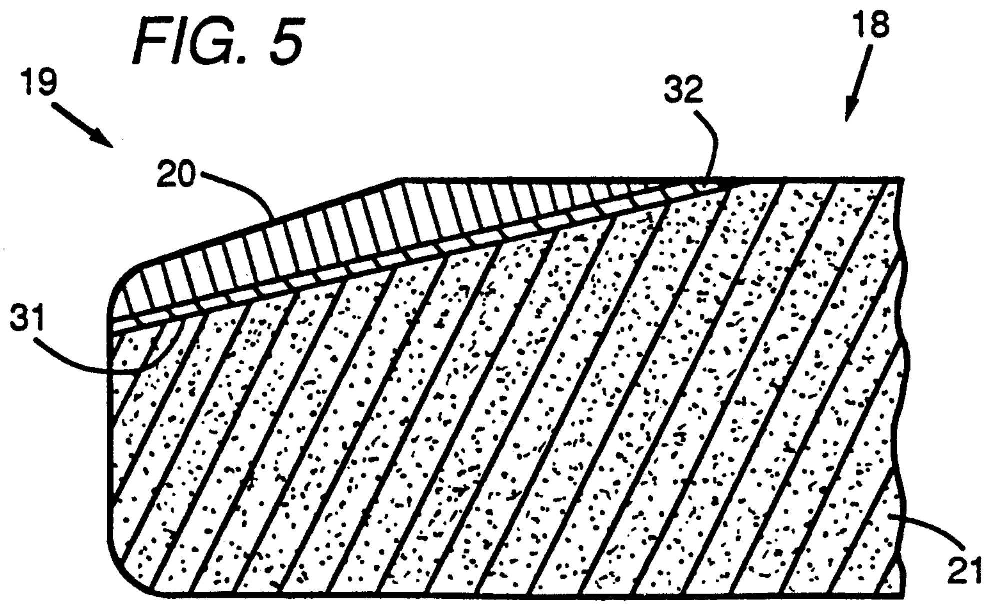
FIG. 5 is an enlarged partial sectional view of the anode body provided with an anode target layer deposited on top of the microcracked barrier layer to form the anode of the preferred embodiment.

Anode 18 is further provided with a focal track layer 19 on which electrons generated by filament 14 impinge to produce x-rays. Focal track layer 19, as shown in FIG. 5, further comprises a diffusion barrier layer 32 contiguously disposed on a focal track region of surface 31 and an anode target layer 20 disposed on top of diffusion barrier layer 32. Diffusion barrier layer 32 prevents carbide formation of material used for anode target layer 20.

Diffusion barrier layer 32 is generally made of materials, such as rhenium, ruthenium or osmium. Rhenium is preferred. Anode target layer 20 is generally made of tungsten or tungsten alloyed with rhenium, typically up to 15% by weight. Tungsten alloyed with about 5% to about 10% of rhenium is preferred.

X-ray tube 10 of FIG. 1 is further provided with rotating means located at the second end of envelope 11 for rotating anode 18. The rotating means comprise rotor 24 having a shaft 23 journaled on an internal bearing support 25 which is, in turn, supported from a ferrule 26, positioned at a second end of envelope 11. Shaft 23 is secured to anode 18 through a centrally disposed opening in anode 18. The stator coils for driving rotor 24, such as a stator of an air induction motor are omitted from FIG. 1. High voltage is supplied to anode 18 via a supply line, not shown, coupled to a connector 27.

Figure 2:
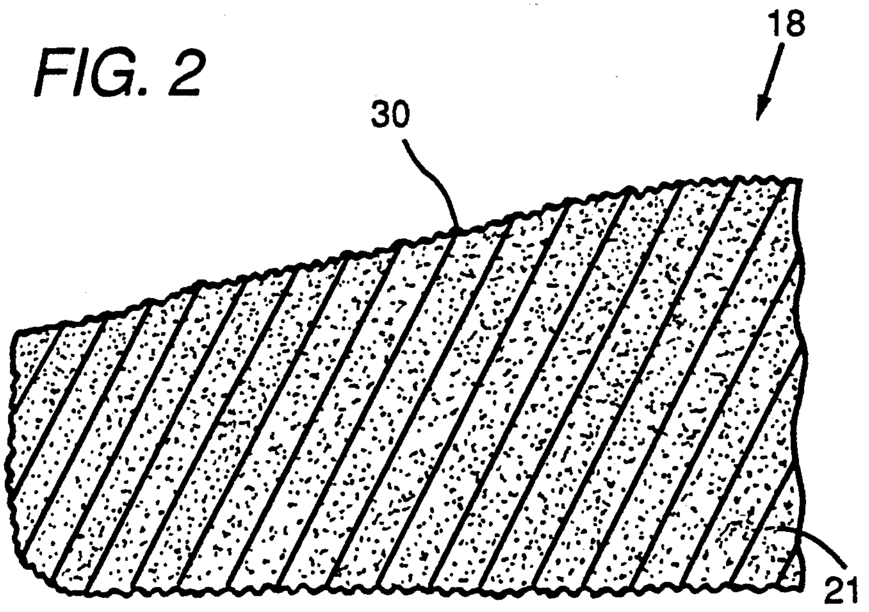
FIG. 2 is an enlarged partial sectional view of a graphite anode body provided with a shape formed surface having surface damage thereon.

During the fabrication of anode 18, a graphite substrate is shape formed into a desired shape by such conventional machining methods as grinding, milling, electroforming, cutting, turning, and polishing. Such a machining procedure produces significant damage to the focal track region of surface 30, shown in FIG. 2, on which focal track layer 19 is deposited. The aforementioned damage results from the highly brittle nature of graphite and it typically extends to a depth of about 25 to 50 micrometers on the surfaces of anode body 18 machined by a grinding operation. It should be noted that the damage shown on the damaged layer of surface 30 of FIG. 2, in proportion to size of anode body 21, has been highly exaggerated for illustrative purposes only because the actual damage on surface 30 cannot be seen by a naked eye. Adhesion between focal track layer 19 and the focal track region of surface 30 is significantly improved by substantially removing the aforementioned damaged layer from surface 30 and exposing an undamaged surface underneath it. The present invention provides means for removing such a damaged layer of graphite from surface 30.

After the aforementioned shape forming step, the graphite substrate is generally pretreated to drive off surface contaminants and adsorbed gases. Such pretreatment is generally carried out by a conventional method, such as heating the substrate to a temperature above about 1800° C. in a furnace which has been initially pumped down to a fairly low vacuum to substantially eliminate oxygen after which hydrogen is fed through the furnace. Such a process is disclosed in commonly assigned UK Patent Application No. GB 2084124 A.

Figure 3:
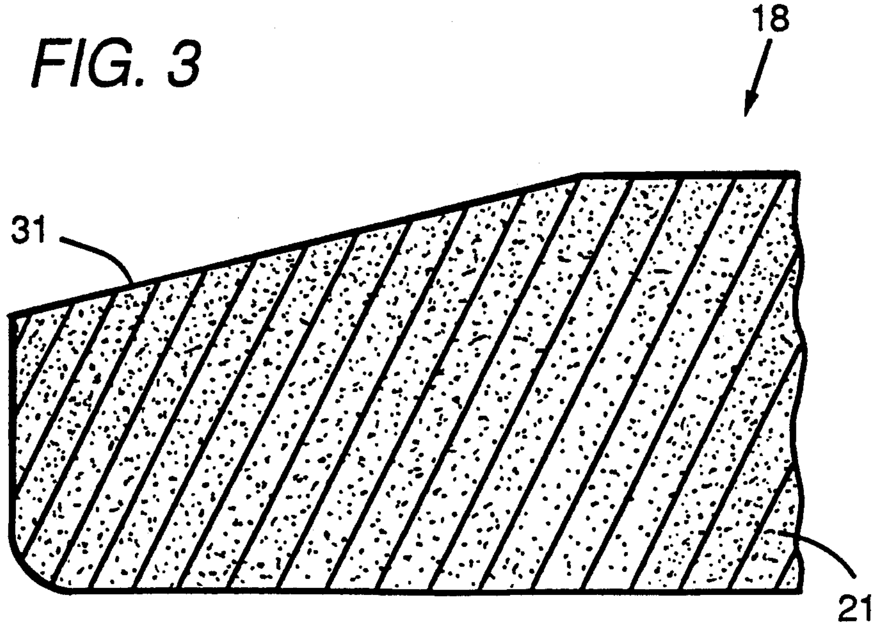
FIG. 3 is an enlarged partial sectional view of the anode body provided with an undamaged surface.

Surface 30 of anode body 18, after the aforementioned pretreatment step, is subjected to an oxidizing step during which the damaged layer of graphite is oxidized to carbon dioxide until an undamaged surface 31, shown in FIG. 3, below surface 30 is exposed. Anode body 18 is preferably oxidized in air by heating it to a temperature of about 650° C. to about 900° C. for about forty-five minutes to about one hour and thirty minutes. Oxidation at about 800° C. for about one hour is most preferrred. Generally, a layer of about 50–100 micrometers is removed during the oxidation step.

Deposition of diffusion barrier layer 32 on focal track region of surface 31 may be carried out by any suitable method, such as chemical vapor deposition (CVD), molten electrolytic plating, DC arc plasma spraying at atmospheric and at sub-atmospheric pressure and RF plasma spraying at atmospheric and at sub-atmospheric pressure. CVD is preferred.

Figure 4:
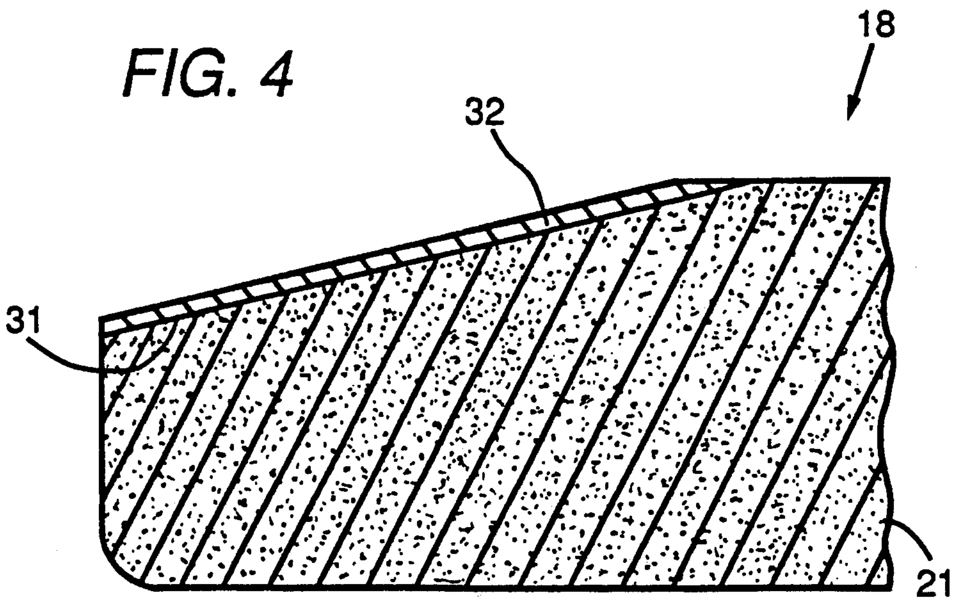
FIG. 4 is an enlarged partial sectional view of the anode body provided with a microcracked rhenium diffusion barrier layer on the undamaged surface.
Figure 11:
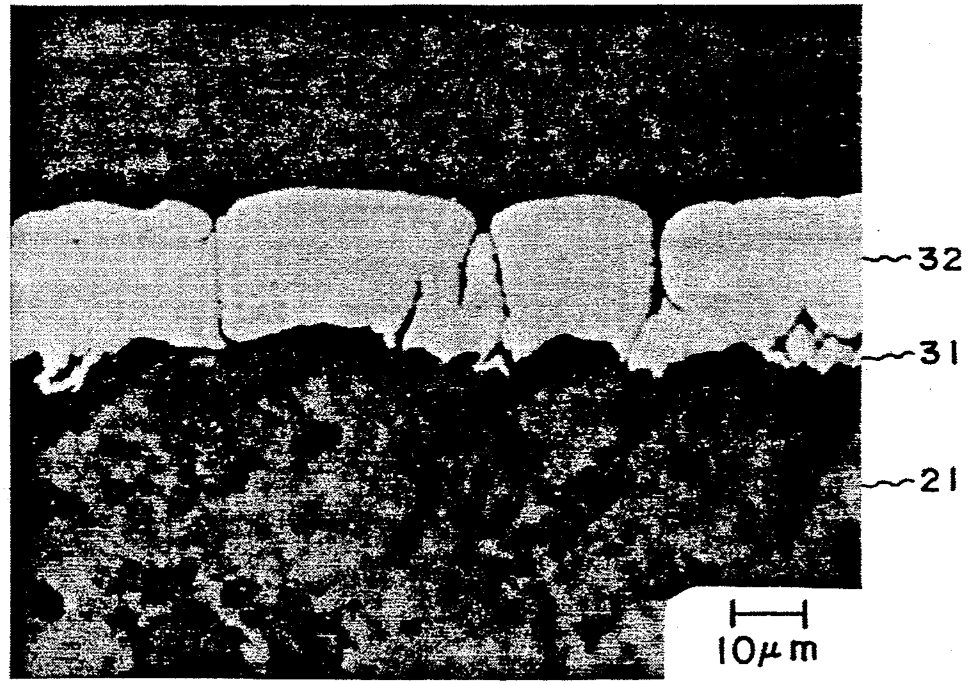
FIG. 11 represents a photomicrograph of an enlarged view of a microcracked rhenium layer on a graphite surface.

During the CVD process, a gaseous mixture of a compound of rhenium, such as $ReF_6$, and hydrogen is conveyed into a CVD chamber maintained at a pressure of about 20 to about 200 Torr, preferably at about 100 Torr. The flow rate of $ReF_6$ is about 20 to about 40 standard cubic centimeters per minute (sccm), preferably about 30 sccm and the volumetric ratio of hydrogen to $ReF_6$ in the mixture is at about 100:1 to about 500:1, preferably about 200:1. In order to deposit rhenium on anode body 21, the mixture is preferably directed at anode body 21 placed within the CVD chamber at a velocity gradient of at least about 1050 cm/cm-sec, preferably at a velocity gradient of at least about 2000 cm/cm-sec through a slit aperture proximately positioned near rotating anode body 21, at about 5 mm to 25 mm, preferably at about 7 mm from anode body 21. Anode body 21 is inductively heated to about 325° C. to about 475° C., preferably to about 350° C. The mixture is energized by the heat from anode body 21 to degrade into fragments, which then adsorb and decompose on surface 31 of anode body 21 to form diffusion barrier layer 32 of rhenium shown in FIG. 4. The process is conducted until about 5 to 50 micrometers, preferably about 15 micrometers, of rhenium layer 32 having microcracks, as shown in FIG. 11, is deposited on the surface of anode body 21. The aforementioned thickness of 15 micrometers, under the aforementioned preferred CVD conditions, is produced in about 15 minutes. The aforementioned CVD process is preferably carried out in an apparatus disclosed in U.S. Pat. No. 4,920,012 to Woodruff et al., which is incorporated herein by reference.

Figure 8:
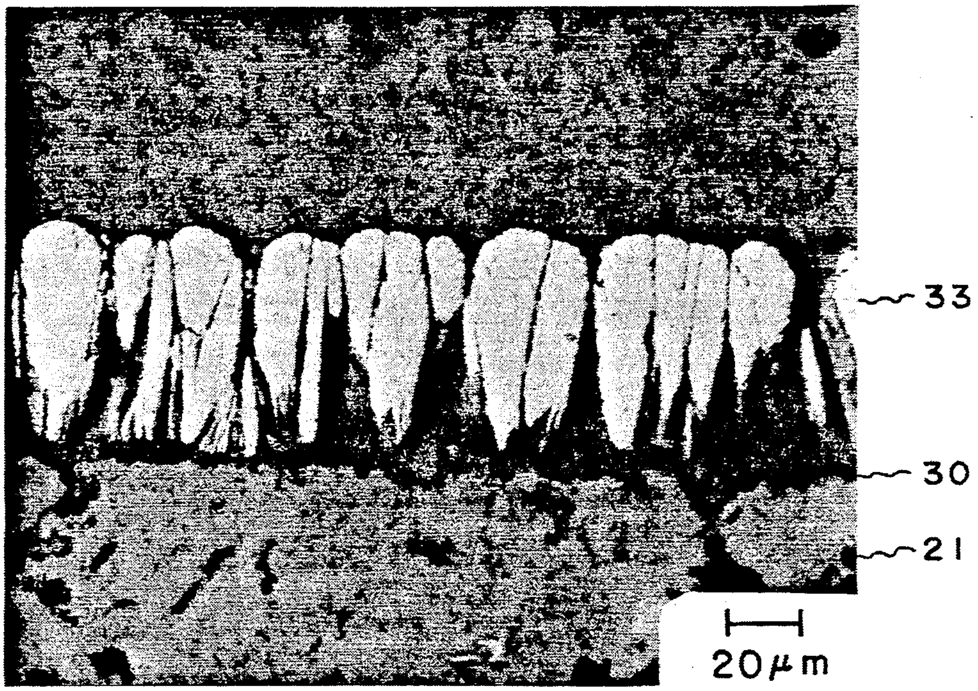
FIG. 8 represents a photomicrograph of an enlarged view similar to a dendritic structure of a rhenium layer on a graphite anode body known in the prior art.
Figure 9:
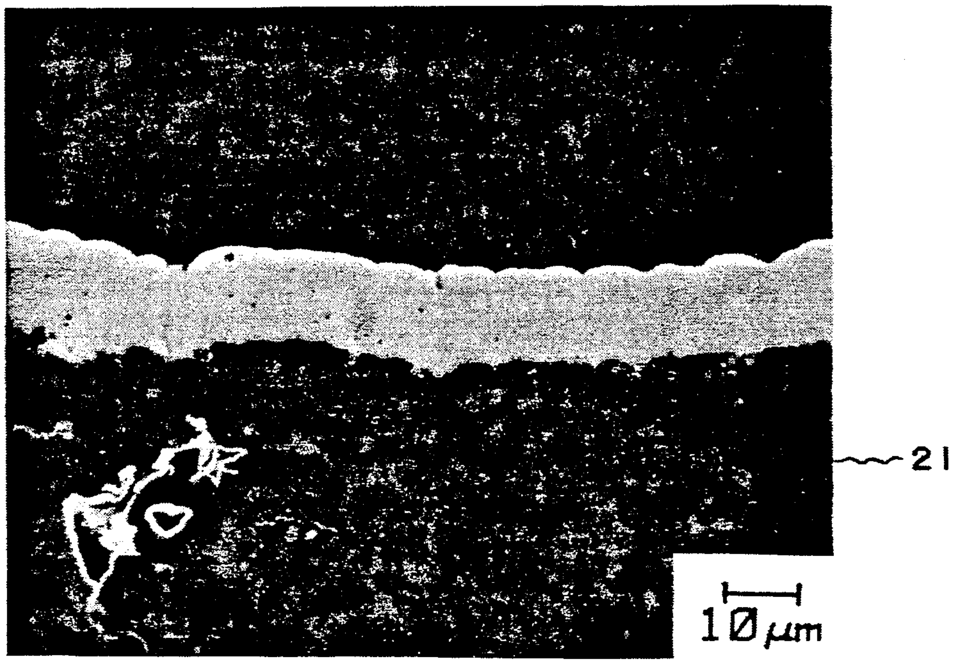
FIG. 9 represents a photomicrograph of an enlarged view of a continuous rhenium layer on a graphite surface.
Figure 10:
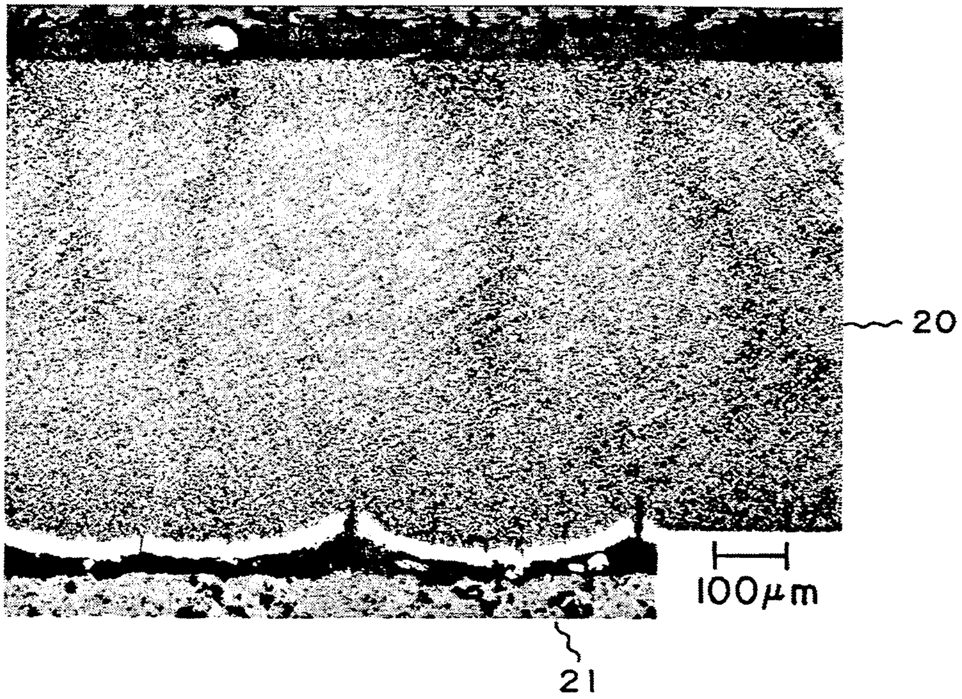
FIG. 10 represents a photomicrograph of an enlarged view of delamination that results to the continous rhenium layer of FIG. 9 during a pyrolytic carbon infiltration step, i.e. sealing of the exposed portion of graphite anode body with an impervious coating of pyrolytic carbon.

The thickness as well as morphology of barrier layer 32 is dependent upon the chemical vapor deposition conditions, such as temperature of anode body 21, the distance between the slit aperture and anode body 21, the CVD chamber pressure, and the volumetric ratio of $ReF_6$ to hydrogen. The chemical vapor deposit morphology of barrier layer 31 may vary from a dendritic structure, shown in FIG. 8, to a smooth and dense film shown in FIG. 9. The dendritic structure seen in FIG. 8 is similar to structures known in the prior art. Both of the aforementioned rhenium layers are effective as diffusion barriers for preventing carbide formation of anode target material. However, as shown in FIG. 10, the smooth and dense rhenium barrier layer is susceptible to delamination during the pyrolytic carbon infiltration of anode 18. As a result, there is a significant loss of adhesion between the barrier layer shown in FIG. 9 and graphite anode body 21. However, an unexpectedly significant improvement in adhesion of the barrier layer to the surface of graphite anode body 21 is noted when the aforementioned rhenium diffusion barrier layer 32 having microcracks, shown in FIG. 11, is produced under the aforementioned preferred CVD conditions. The microcracks, present throughout the rhenium barrier layer, exhibit a morphology of closely packed individual grains having a diameter of about 8 to 10 micrometers, preferably about 10 micrometers and a height of about 5 to about 50 micrometers, preferably about 15 micrometers. It is believed that the aforementioned microcracks relieve the thermal stresses experienced by the diffusion barrier layer during the deposition of anode target layer 20 of tungsten or tungsten rhenium alloy on top of it. As a result, such a microcracked rhenium diffusion barrier layer 32, shown in FIGS. 4, 5, 7 and 11 exhibits a significant improvement in adhesion to the focal track region of anode 18.

Anode 18 of x-ray tube 10 is provided with anode target layer 20, shown in FIG. 5, by conventional deposition means, such as CVD, molten electrolytic plating, DC arc plasma spraying at atmospheric or at sub-atmospheric pressure or RF plasma spraying at atmospheric or at sub-atmospheric pressure. CVD is preferred. Anode target layer 20 comprises tungsten or an alloy of tungsten and rhenium. Generally, a layer of about 500 to 1000 micrometers, preferably about 750 micrometers is provided.

After the deposition of anode target layer 20 of desired thickness, it is machined to a desired shape. Finally, anode 18 is subjected to pyrolytic carbon infiltration process to seal off the exposed surfaces of graphite anode body 21. By sealing off the exposed surfaces of graphite anode body 21, particulates and occluded gases within graphite anode body 21 are prevented from dusting off into high vacuum of an x-ray tube. The aforementioned process also prevents electrical break-down or flashover between anode 18 and cathode 13. In the pyrolytic carbon infiltration process, disclosed in the aforementioned UK Patent Application No. GB 2084124 A, anode 18 is maintained in furnace at a temperature of about 1000° C. to about 1100° C. and a gaseous mixture of methane and hydrogen is flowed through the furnace maintained at a pressure of about 1 to about 3 Torr. The aforementioned process is carried out for a long time, typically for about 35 hours to produce a coating that is tightly adherent, anisotropic and is comprised of very small graphite crystallites aligned with basal planes parallel to the local surface on which they are deposited.

Figure 6:
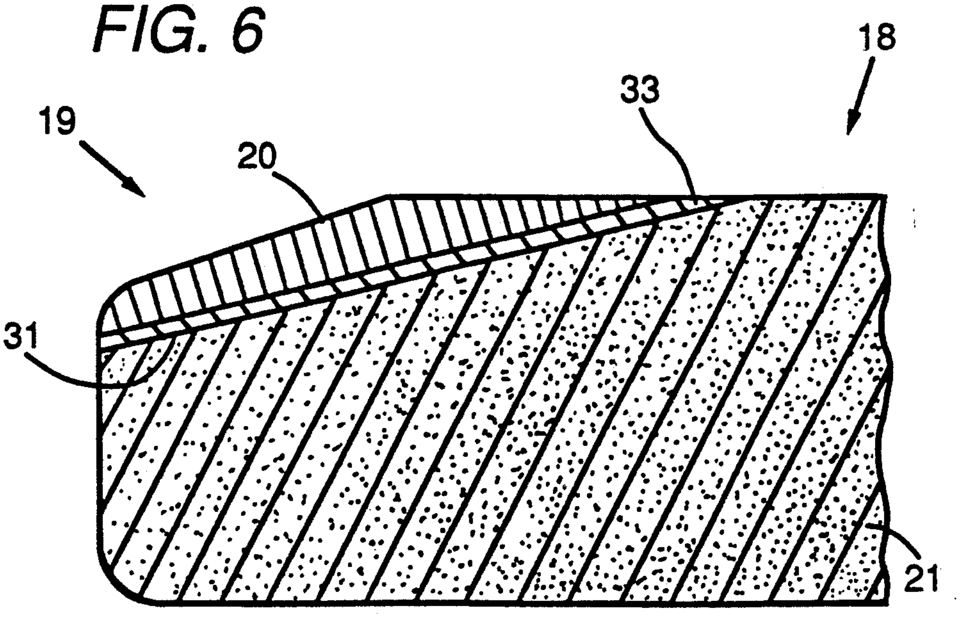
FIG. 6 is an enlarged partial sectional view of another embodiment of the present invention.

In another embodiment of the present invention, shown in FIG. 6, the focal track region of surface 31, is oxidized by the aforementioned oxidizing step of the present invention to expose a surface substantially free from damage produced during the shape forming step. The aforementioned damage free surface is provided with a rhenium diffusion barrier layer 33, followed by anode target layer 20 of tungsten or tungsten rhenium alloy.

Figure 7:
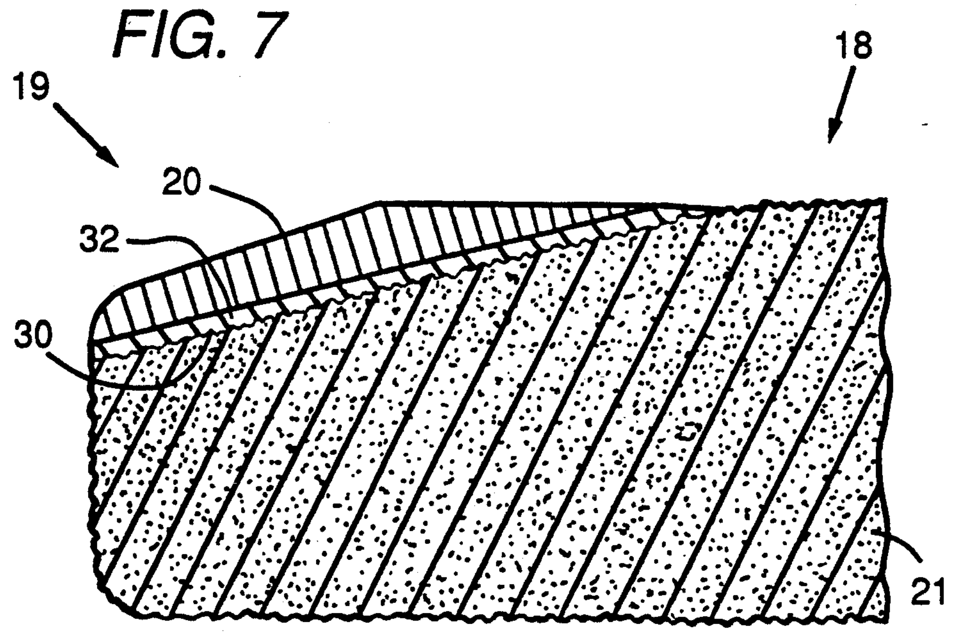
FIG. 7 is an enlarged partial sectional view of yet another embodiment of the present invention.

In yet another embodiment of the present invention, shown in FIG. 7, the focal track region of surface 30 is provided with the previously described microcracked rhenium diffusion barrier layer 32 followed by anode target layer 20 of tungsten or tungsten rhenium alloy. Microcracked rhenium diffusion barrier layer 32 is deposited by the aforementioned CVD method.

The present invention will be further understood from the illustration of specific examples which follow. These examples are intended for illustrative purposes only and should not be construed as limitation upon the broadest aspects of the invention.

EXAMPLE 1

A graphite substrate of x-ray target after the machining step was subjected to oxidizing step during which the surface layer damaged during the machining step was removed to expose undamaged layer underneath. The substrate was oxidized for one hour @ 800° C. The oxidized substrate was then subjected to chemical vapor deposition of rhenium layer @ 350° C. and 100 Torr. The rhenium diffusion layer had microcracks similar to those shown in FIG. 11. The anode target layer of tungsten was deposited on top of the rhenium diffusion layer.

An accelerated test protocol was used to focus an x-ray beam of variable power on a target area of 8.79 millimeters in length (L)×0.75 millimeters in width (W).

TABLE 1

| kiloWatts (kW) of x-ray power | $L(W)^{1/2}$ $mm^{3/2}$ | $kW/L(W)^{1/2}$ $kW/mm^{3/2}$ | % of time x-ray power is on |
|---|---|---|---|
| 24 | 7.61 | 3.15 | 100 |

No failure occurred at the end of the accelerated scans of 10,000, which translate to about 40,000 scans of the standard test conducted on the target sample of Example 2.

EXAMPLE 2

A control test was conducted to compare the x-ray target of Example 1 with an x-ray target produced without the oxidizing step and microcracked rhenium layer of the x-ray target in Example 1. A graphite substrate of x-ray target after the machining step was subjected to chemical vapor deposition of rhenium layer @ 650° C. and 50 Torr. The rhenium diffusion layer had dendritic morphology similar to that of the prior art shown in FIG. 8. The anode target layer of tungsten was deposited on top of the rhenium diffusion layer. The aforementioned target represents a target closest to prior art.

A standard test protocol was used to focus an x-ray beam of variable power on a target area of 16.88 millimeters in length (L)×1.44 millimeters in width (W). The severity of the standard test is about ¼th that of the accelerated test conducted in Example 1.

TABLE 2

| kiloWatts (kW) of x-ray power | $L(W)^{1/2}$ $mm^{3/2}$ | $kW/L(W)^{1/2}$ $kW/mm^{3/2}$ | % of time x-ray power is on |
|---|---|---|---|
| 30 | 20.26 | 1.481 | 40 |
| 38.4 | " | 1.895 | 21.2 |
| 48 | " | 2.37 | 32.9 |
| 60 | " | 2.96 | 5.9 |

As shown in the Tables 1 and 2, the ratio of kW/L(W)½ is more severe in the accelerated test of Table 1 than the standard test of Table 2. The test was discontinued because the target experienced delamination failure after 30,828 of standard x-ray scans, which translate to about 7707 of the accelerated test scans performed in Example 1.

EXAMPLE 3

A control test was conducted to compare the x-ray target of Example 1 with an x-ray target produced without the oxidizing step and microcracked rhenium layer of the x-ray target in Example 1. A graphite substrate of x-ray target after the machining step was subjected to chemical vapor deposition of rhenium layer @ 300° C. and 100 Torr. The rhenium diffusion layer was a continuous layer similar to that shown in FIG. 9. The anode target layer of tungsten was deposited on top of the rhenium diffusion layer. The target failed due to delamination of the aforementioned continuous rhenium layer during the pyrolytic carbon infiltration process. The resulting cross-section is similar to the one shown in FIG. 10.

While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. An x-ray tube anode comprising a graphite anode body wherein any damaged surface graphite has been removed by heating in air at about 650°-900° C. for about 45-90 minutes, and a focal track layer disposed on the surface of said graphite body for impingement by electrons to produce x-rays.

2. The improved x-ray tube anode according to claim 1 wherein said focal track layer comprises:

a diffusion barrier layer of rhenium contiguously disposed on said region; and an anode target layer of tungsten or tungsten rhenium alloy disposed on top of said diffusion barrier layer.

3. A method of improving adherence of a focal track layer of an anode of an x-ray tube to a graphite anode body of said tube comprising:

shape forming a graphite substrate into said anode body having a surface with a focal track region thereon;

oxidizing a layer on said surface damaged during said shape forming step by heating in air at about 650°-900° C. for about 45-90 minutes to expose an undamaged surface underneath said damaged layer; and depositing said focal track layer on top of said undamaged surface of said focal track region.

4. An improved x-ray tube comprising:

a substantially evacuated and sealed envelope;

a cathode structure positioned at a first end within said envelope, said cathode structure comprising a support, an electron emissive filament and a focussing cup mounted on said support, a pair of filament conductors for supplying heating current to said filament and a ground conductor to electrically ground said structure;

an anode comprising a graphite anode body whereon any surface damage caused during shape forming has been removed by heating in air at about 650°-900° C. for about 45-90 minutes; a focal track layer contiguously disposed on top of said body for impingement by electrons emitted by said filament for producing x-ray; and rotating means positioned at a second end within said envelope for rotating said anode.

5. A method of producing a graphite substrate comprising:

shape forming said substrate; and oxidizing any damaged graphite on said shape formed surface by heating in air at about 650°-900° C. for about 45-90 minutes to expose an undamaged surface underneath said damaged graphite.

6. The method according to claim 5 wherein said shape forming step comprises machining said substrate.

7. The method according to claim 5 wherein said substrate is an anode body of an x-ray tube.

8. A method of producing an improved anode for an x-ray tube comprising:

shape forming a graphite substrate into an anode body having a surface with a focal track region thereon;

oxidizing a layer on said surface damaged during said shape forming step by heating in air at about 650°-900° C. for about 45-90 minutes to expose an undamaged surface underneath said damaged layer;

chemical vapor depositing a rhenium diffusion barrier layer on top of said undamaged surface of said region; and chemical vapor depositing an anode target layer of tungsten or tungsten-rhenium alloy on top of said diffusion barrier layer.

* * * * *